US010928280B2

(12) United States Patent
Sotomayor

(10) Patent No.: US 10,928,280 B2
(45) Date of Patent: Feb. 23, 2021

(54) SAMPLE ENCAPSULATION SYSTEM

(71) Applicant: ILLINOIS TOOL WORKS INC., Glenview, IL (US)

(72) Inventor: Thomas E. Sotomayor, Streamwood, IL (US)

(73) Assignee: Illinois Tool Works Inc., Glenview, IL (US)

( * ) Notice: Subject to any disclaimer, the term of this patent is extended or adjusted under 35 U.S.C. 154(b) by 333 days.

(21) Appl. No.: 15/779,669

(22) PCT Filed: Nov. 30, 2016

(86) PCT No.: PCT/US2016/064184
§ 371 (c)(1),
(2) Date: May 29, 2018

(87) PCT Pub. No.: WO2017/095903
PCT Pub. Date: Jun. 8, 2017

(65) Prior Publication Data
US 2018/0372596 A1 Dec. 27, 2018

Related U.S. Application Data

(60) Provisional application No. 62/261,634, filed on Dec. 1, 2015.

(51) Int. Cl.
*G01N 1/36* (2006.01)
*G01N 1/28* (2006.01)
(Continued)

(52) U.S. Cl.
CPC ................ *G01N 1/36* (2013.01); *B30B 11/02* (2013.01); *B30B 11/027* (2013.01); *B30B 11/34* (2013.01);
(Continued)

(58) Field of Classification Search
USPC ........................................................ 73/863.11
See application file for complete search history.

(56) References Cited

U.S. PATENT DOCUMENTS 8,850,971 B1 10/2014 Shreve et al.
2003/0091676 A1* 5/2003 Warren .................. F27B 17/02 425/128
(Continued)

FOREIGN PATENT DOCUMENTS

CN 2482071 Y 3/2002
GB 1387932 A 3/1975
(Continued)

OTHER PUBLICATIONS

International Search Report and Written Opinion issued by ISA/EPO in connection with PCT/US2016/064184 dated Apr. 20, 2017.
(Continued)

*Primary Examiner* — Clayton E. LaBalle
*Assistant Examiner* — Warren K Fenwick
(74) *Attorney, Agent, or Firm* — Levenfeld Pearlstein, LLC

(57) ABSTRACT

A sample encapsulation system includes a fixture, a base, a chamber having an inlet and a chamber housing. The housing has inner and outer housings. The chamber is mounted in the inner housing. The base, chamber and housing are affixed to one another and movable in the fixture. A cap has a first ram operably mounted thereto for engaging the chamber inlet. A second ram in the chamber opposite the inlet moves toward and away from the first ram. A heating assembly is positioned in the inner housing and a cooling assembly including a cooling jacket defined in part by the inner and outer housings includes a manifold. The chamber, housing and base are movable toward and away from the cap for engaging and disengaging the first ram with the chamber during and after the encapsulation cycle, respectively. The
(Continued)

cooling system includes a vacuum breaker to self-drain following cooling.

13 Claims, 15 Drawing Sheets

(51) Int. Cl.

| | |
|---|---|
| ***B30B 11/34*** | (2006.01) |
| ***B30B 15/34*** | (2006.01) |
| ***B30B 11/02*** | (2006.01) |
| ***H05B 3/64*** | (2006.01) |
| ***F27D 11/00*** | (2006.01) |
| ***F27D 9/00*** | (2006.01) |

(52) U.S. Cl.
CPC ................ *B30B 15/34* (2013.01); *F27D 9/00* (2013.01); *F27D 11/00* (2013.01); *G01N 1/286* (2013.01); *H05B 3/64* (2013.01)

(56) References Cited

U.S. PATENT DOCUMENTS

2014/0318392 A1 10/2014 Sajgalik et al.
2014/0367251 A1 12/2014 Adachi
2015/0143928 A1* 5/2015 Freson .................... B30B 11/04 73/863.11

FOREIGN PATENT DOCUMENTS

JP 2010094721 A 4/2010
WO 2013089650 A1 6/2013
WO 2014014925 A2 1/2014

OTHER PUBLICATIONS

International Preliminary Report on Patentability issued by International Bureau of WIPO in connection with PCT/US2016/064184 dated Jun. 14, 2018.

* cited by examiner

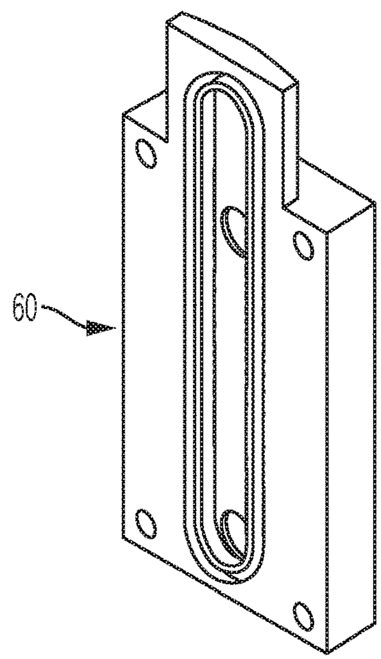
FIG. 18A
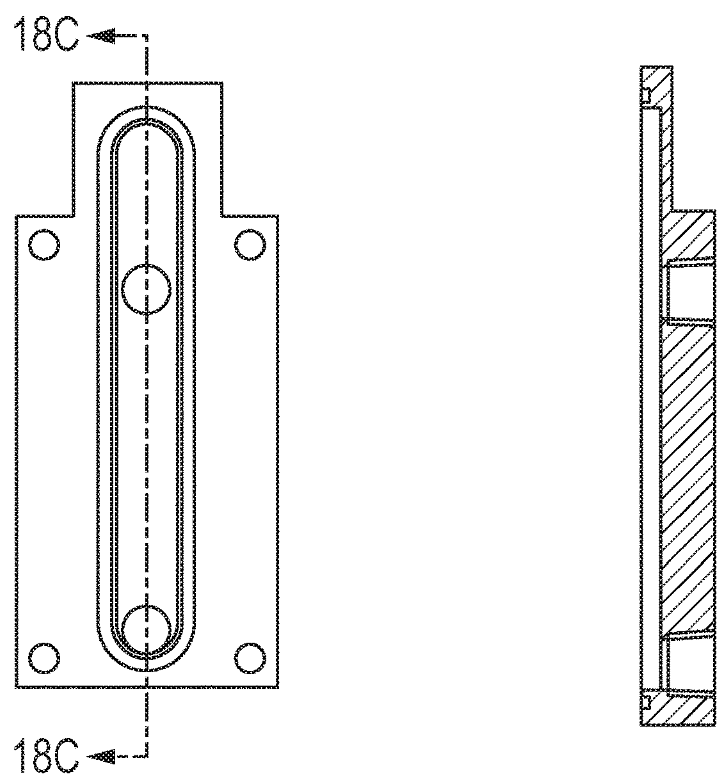
FIG. 18B
FIG. 18C

SAMPLE ENCAPSULATION SYSTEM

CROSS-REFERENCE TO RELATED APPLICATION DATA

This application claims the benefit of and priority to Provisional U.S. Patent Application Ser. No. 62/261,634, filed Dec. 1, 2015, the disclosure of which is incorporated herein in its entirety.

BACKGROUND

The examination of samples, such as by metallographic examination, requires a number of preparatory steps. For example, a sample may need to be cut or sectioned to a specific size, mounted or encapsulated in a supporting material and ground and/or polished for examination. Such samples are mounted to facilitate handling and to maintain the ability to distinguish between the sample and the material in which the sample is mounted. Mounting materials are typically resins, such as thermoset or thermoplastic resins, including phenolics, phthalates, epoxies, methacrylates and the like. Such materials are commercially available from Buehler, an ITW Company, of Lake Bluff, Ill.

Mounting can be carried out in a number of ways. One way in which to mount a sample is a compression mounting process. In a compression mounting process, the sample is placed in a chamber or mold along with the mounting compound. The sample and compound are heated under pressure for example, by use of heating coils and a hydraulic ram. After a predetermined period of time at a set temperature and pressure, the heat source is isolated from the mold, and a cooling fluid is circulated around the mold to cool the encapsulated sample. After a predetermined period of time, the pressure is released and the sample is removed from the mold.

If the encapsulated sample (i.e., the sample and the molding compound) is not sufficiently cooled prior to releasing pressure and removal from the mold, the molding compound may change shape or shrink (for example, pull away from the sample). This can result in abrasive rounding the edges of the sample during later sample preparation steps, such as grinding, which may compromise the later metallographic examination. In addition, it may be difficult to handle the encapsulated sample if it is not sufficiently cooled.

One system for the encapsulation of samples is disclosed in Freson et al., US Publication No. 2015/0143928, commonly owned with the present application, the disclosure of which is incorporated herein by reference in its entirety. The system in Freson et al. includes a base, a chamber having an inlet and a chamber housing in which the chamber is housed. The chamber is fixedly mounted within the chamber housing and the chamber housing is movably mounted to the base. The system includes a cap, a first ram operably mounted to the cap for engaging the chamber inlet and a second ram positioned in the chamber opposite the inlet. The second ram is movable toward and away from the first ram.

The chamber and housing are movable toward the cap for engaging the first ram with the chamber inlet during an encapsulation cycle and away from the cap, disengaging the first ram from the chamber inlet following an encapsulation cycle.

The system includes a heating assembly and a cooling assembly that are disposed around the chamber. A temperature sensor is mounted remotely from an interior of the chamber. The remote sensed temperature is used to continue or stop operation of the cooling system following a predetermined period of time after the remote sensed temperature reaches a set point temperature based upon a predicted temperature of the encapsulated sample as determined by the remote sensed temperature.

While such a system functions well, it has been found that in the manufacture of the system components, specific tolerances may not be achievable. For example, the chamber and housing are manufactured as cast components. As a result, it may be difficult to achieve a precise fit of the chamber and housing. In addition, the castings resulted in higher material masses, and longer heat up and cool down times than desired.

It has also been found that the placement of certain components and the use of coils for heating and cooling could be problematic, as could properly and quickly draining the system of cooling media (water) following sample removal and prior to commencing an encapsulation cycle.

Accordingly, there is a need for a sample preparation or encapsulation system having a chamber/housing assembly with a high degree of reliability. Desirably, such a system has a lower mass and as such, lower heat up and cool down times. More desirably still, such a system incorporates a passive coolant draining system to facilitate draining the system of coolant following cool down and sample removal and prior to a subsequent encapsulation cycle.

SUMMARY

A sample encapsulation system includes a base, a chamber having an inlet and a chamber housing. The chamber housing has an inner housing and an outer housing. The chamber is fixedly mounted at least in part within the inner housing. The base, chamber and housing are affixed relative to one another.

The system includes a cap to close the chamber. A first ram is operably mounted to the cap for engaging the chamber inlet. A second ram is positioned in the chamber opposite the inlet and is movable toward and away from the first ram. The second ram is driven by a cylinder such as a hydraulic cylinder. The base, chamber and housing are biasedly mounted to the cylinder housing.

A heating assembly is positioned at least in part in the inner housing. In an embodiment, the inner housing includes a plurality of through-bores and heaters, such as electric heaters, are positioned in the through-bores. The base can include a channel formed to accommodate conductors extending to the heaters.

A cooling assembly includes a cooling jacket defined in part by the inner housing and the outer housing, and a manifold mounted to the outer housing. The manifold includes two openings in fluid communication with the cooling jacket. One of the openings is a coolant drainage opening and the other opening is a vacuum relief opening. A vacuum relief check valve is mounted to the vacuum relief opening.

In an embodiment, a thermostat is in communication with the inner housing. An opening can be formed in the outer housing and a bore formed in, but not through, the inner housing wall. The outer housing opening and the inner housing bore can be aligned with one another and configured to accommodate a thermostat mount. A thermostat, positioned in the mount, extends into the bore in the inner chamber wall. Conductors are mounted to the thermostat mount.

The chamber and the inner housing can be formed from dissimilar metals having different rates of thermal expansion. In an embodiment, the chamber is fitted into the inner housing by heating the inner housing, cooling the chamber or both. As the chamber and inner housing return to ambient temperature, the two components mount to one another and form a core. In an embodiment, the chamber is formed from steel and the inner housing is formed from aluminum. The chamber and the inner housing can be formed by machining.

These and other features and advantages of the present disclosure will be apparent from the following detailed description, in conjunction with the appended claims.

BRIEF DESCRIPTION OF THE DRAWINGS

The benefits and advantages of the present invention will become more readily apparent to those of ordinary skill in the relevant art after reviewing the following detailed description and accompanying and drawings, wherein:

FIGS. 18A-18C are perspective (FIG. 18A), rear (FIG. 18B) and sectional (FIG. 18C) views of the water jacket manifold.

DETAILED DESCRIPTION

Figure 1:
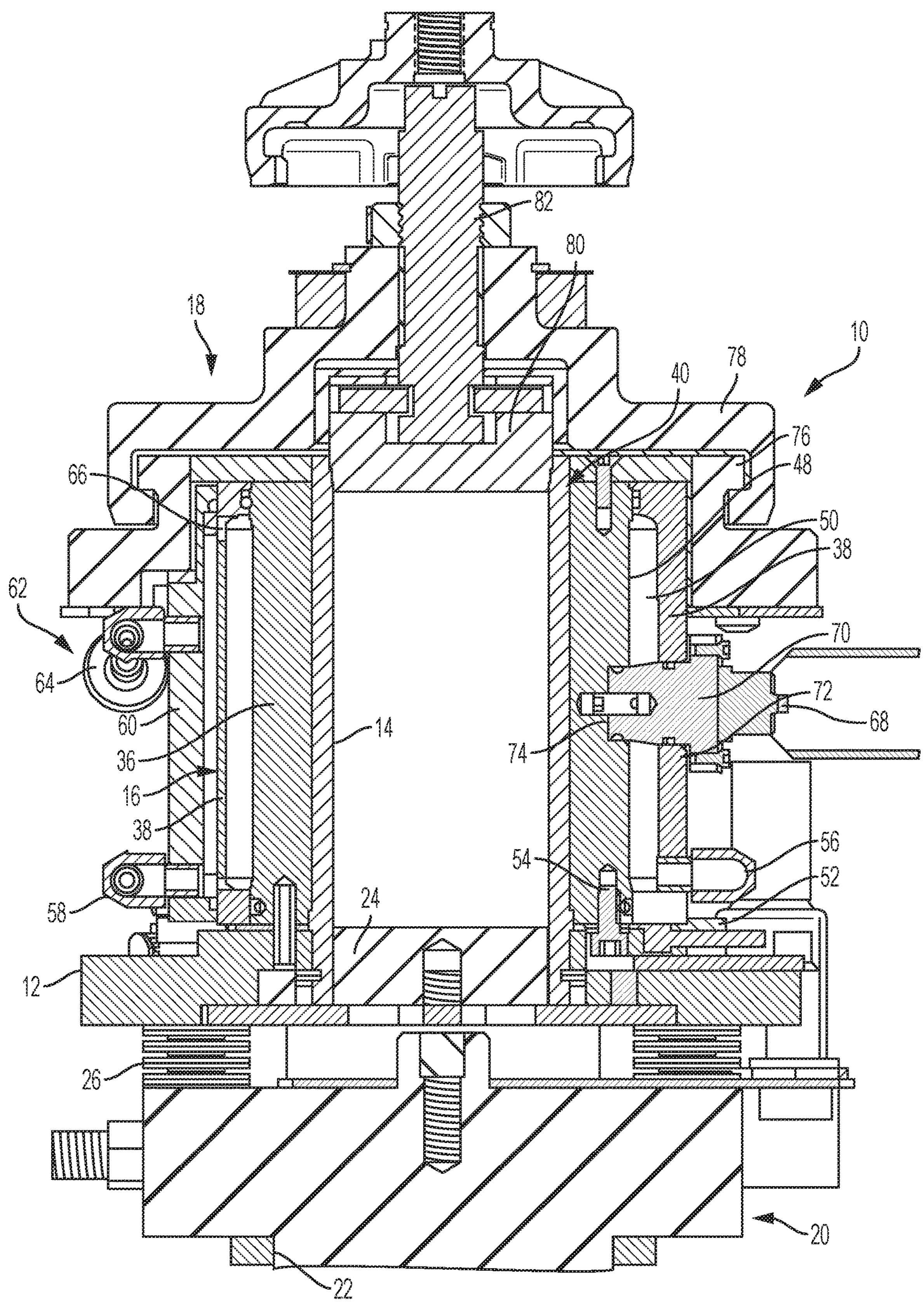
FIG. 1 is a cross-sectional illustration of a sample preparation system shown in a locked position.

While the present invention is susceptible of embodiment in various forms, there is shown in the drawings and will hereinafter be described a presently preferred embodiment with the understanding that the present disclosure is to be considered an exemplification of the device and is not intended to be limited to the specific embodiment illustrated.

Figure 2:
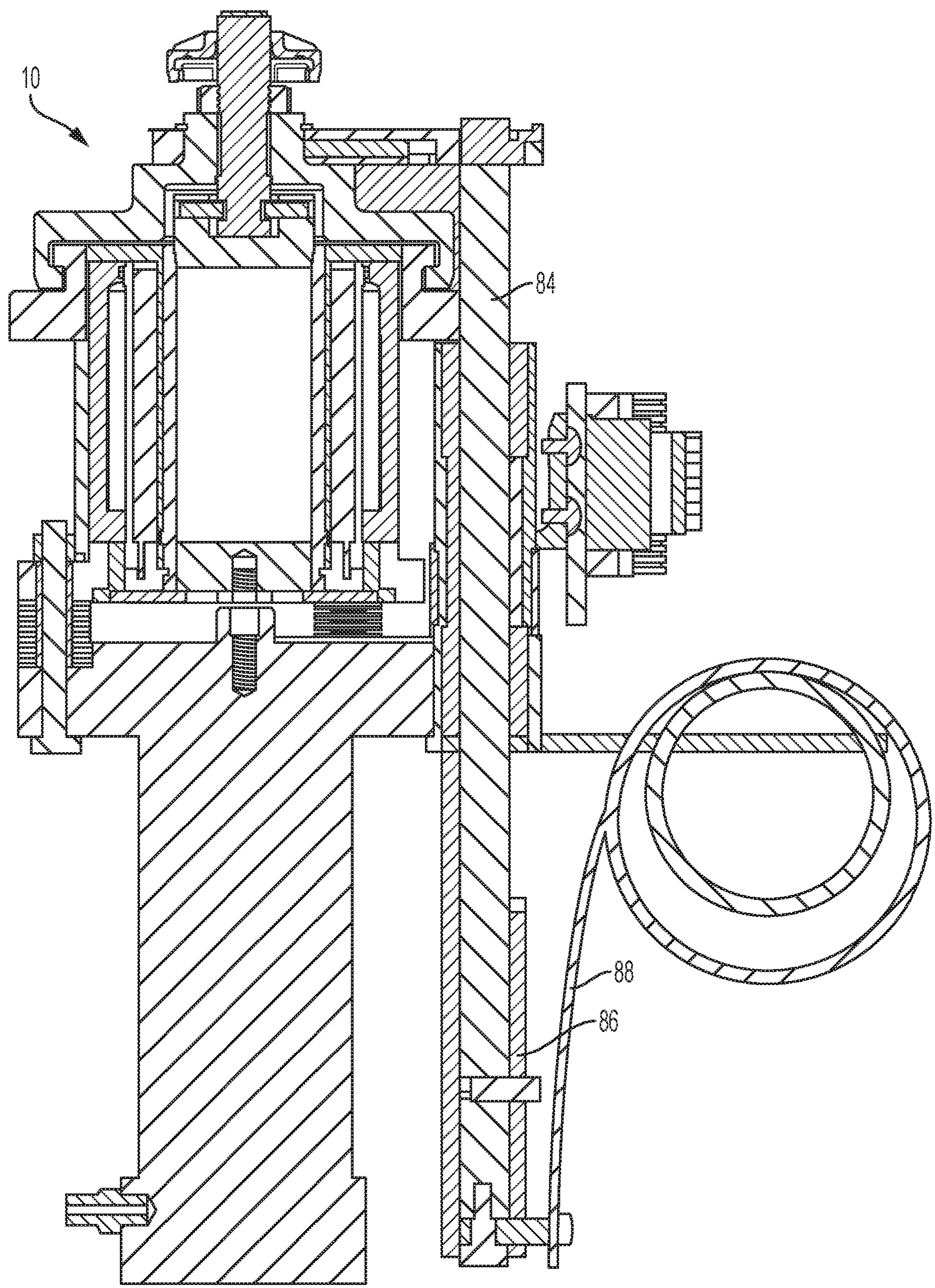
FIG. 2 is another cross-sectional illustration taken about 90 degrees from the view in FIG. 1 and showing a mount for the system.
Figure 3:
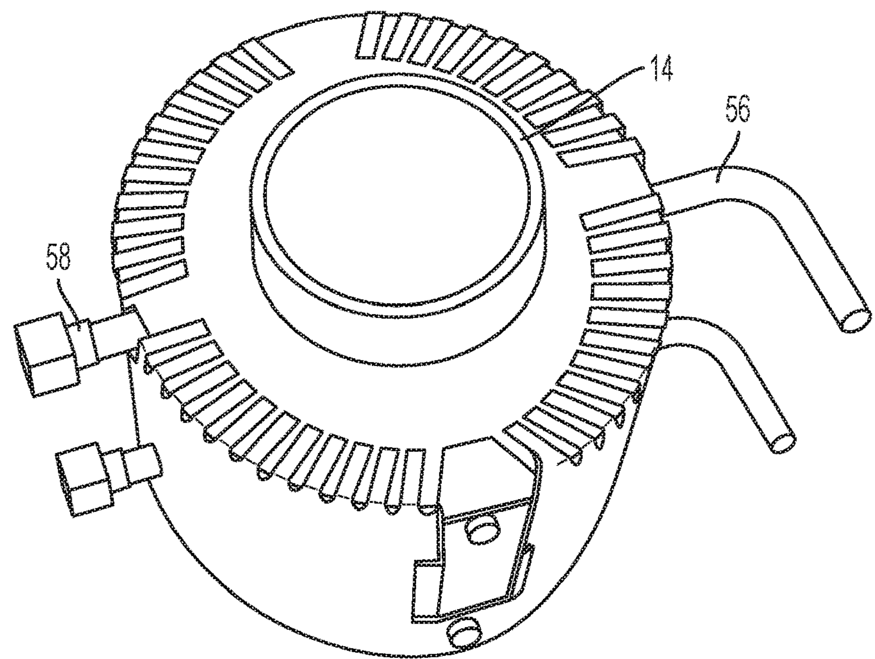
FIG. 3 illustrates the chamber and cooling inlet and outlet conduits.
Figure 4:
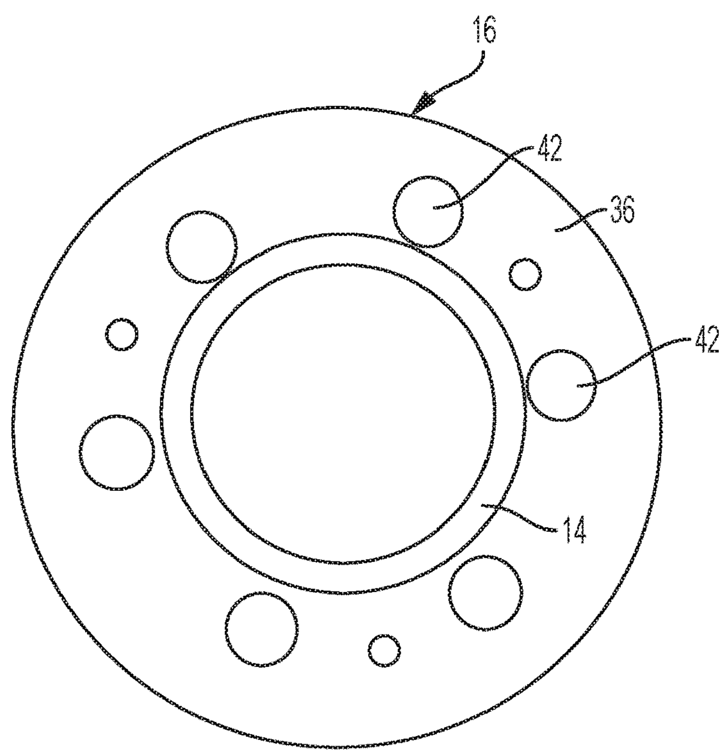
FIG. 4 is a bottom view of the chamber housing and chamber showing the heater through-bores.
Figure 5:
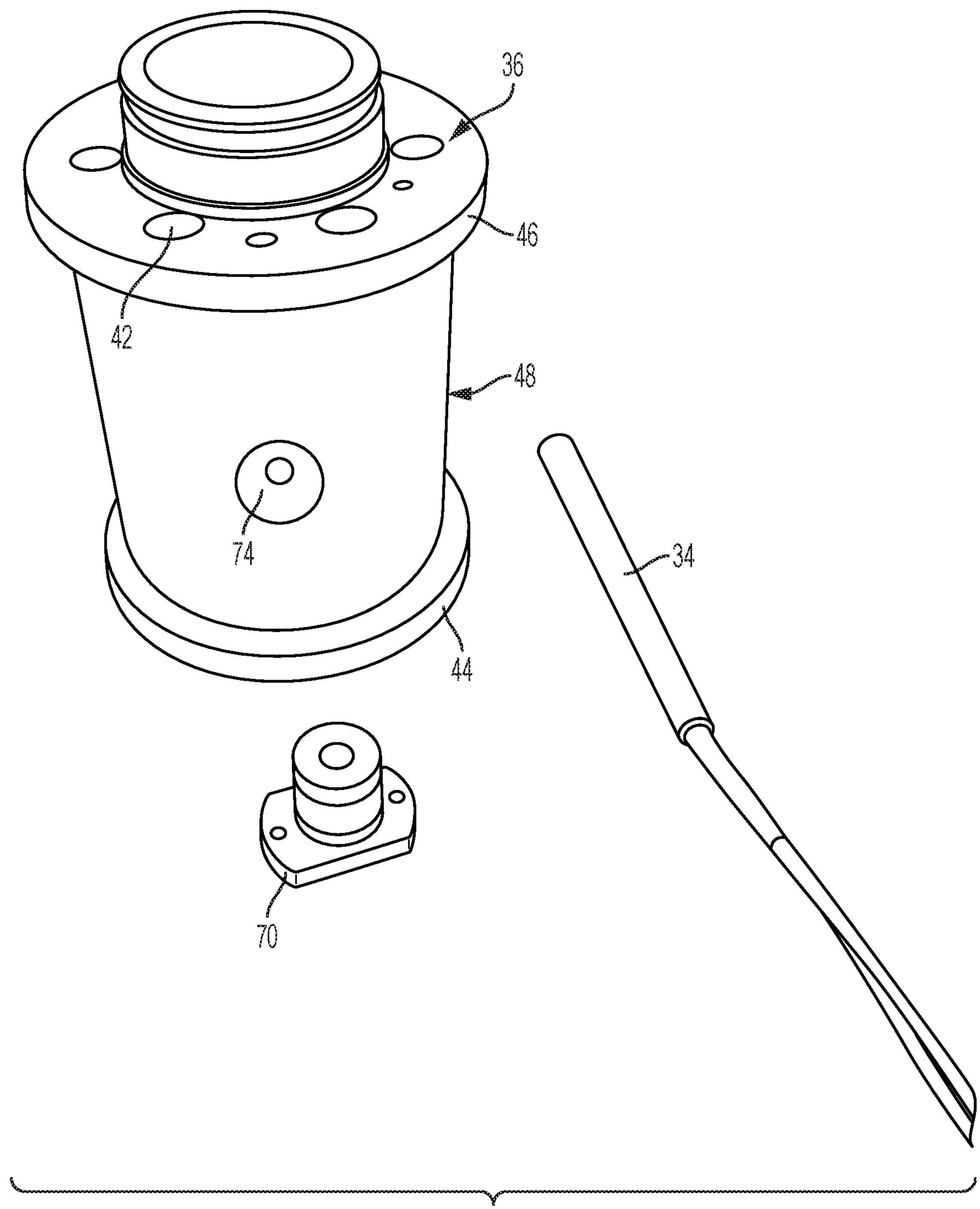
FIG. 5 illustrates the inner housing cut-out region and an example of a heater.
Figure 6:
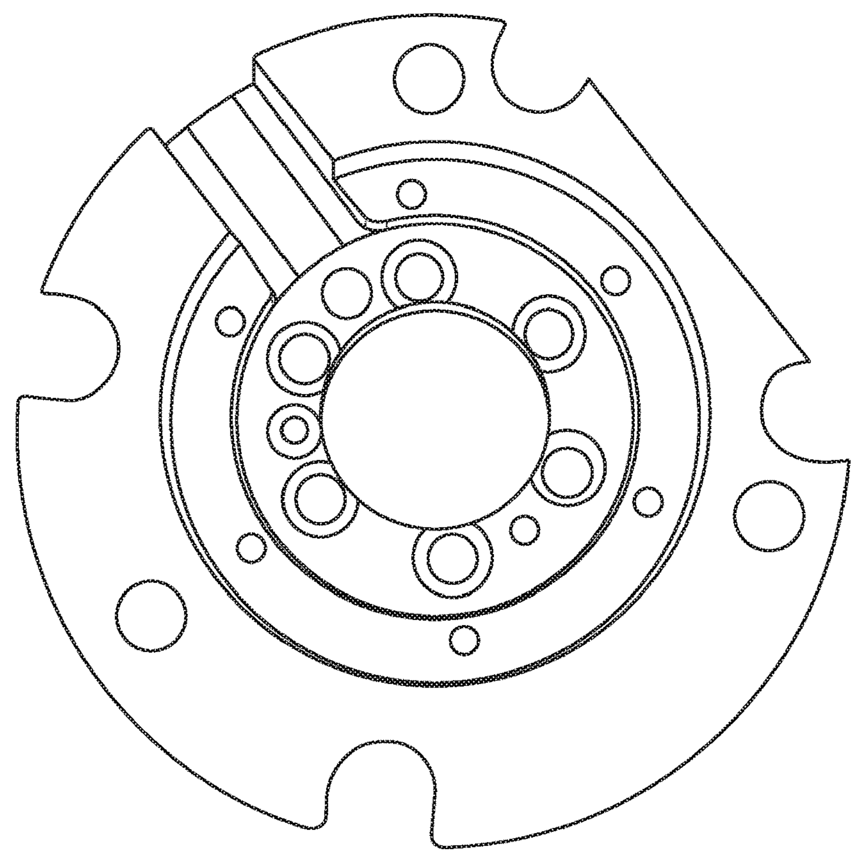
FIG. 6 is a bottom view of the base.
Figure 7:
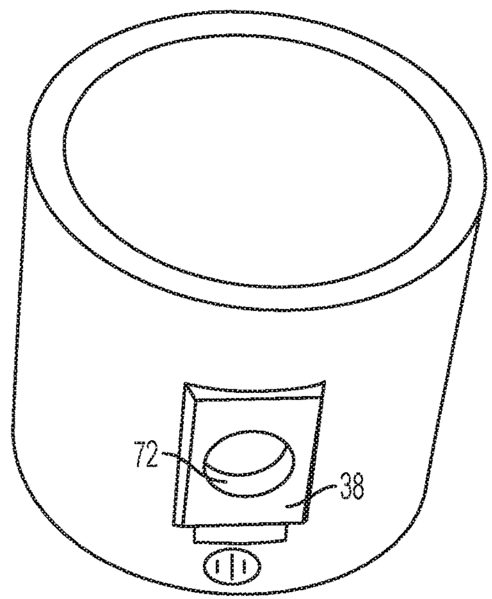
FIG. 7 is a perspective view of the outer housing showing the thermostat keyed fitting opening.
Figure 8:
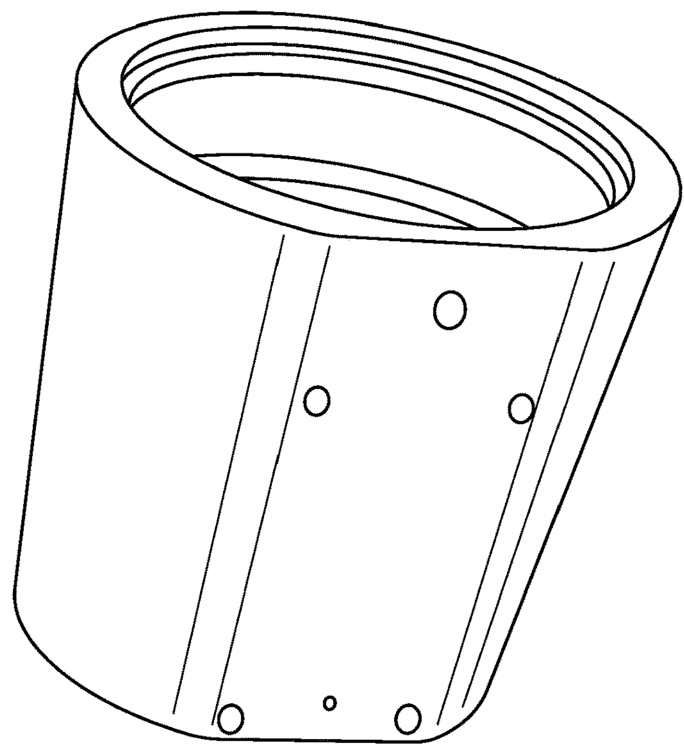
FIG. 8 is a perspective view of the outer housing.

Referring now to the figures and in particular, to FIGS. 1-2, there is shown generally a sample preparation or encapsulation system 10. The system 10 includes, generally, a base 12, a chamber 14, a chamber housing 16, a chamber cap assembly 18 and a control system (not shown).

The base 12 is a mounting system for the chamber housing 16 and chamber 14. The base 12 is mounted to a cylinder housing 20 that houses a cylinder 22 for a lower ram 24. The base 12 is biasedly mounted to the cylinder housing 20. In an embodiment, the biased mount is a three-point mount and wave springs 26 are positioned between the base 12 and the cylinder housing 20. In this manner, the base 12 (with the chamber 14 and chamber housing 16) move relative to the cylinder housing 20.

Figure 11:
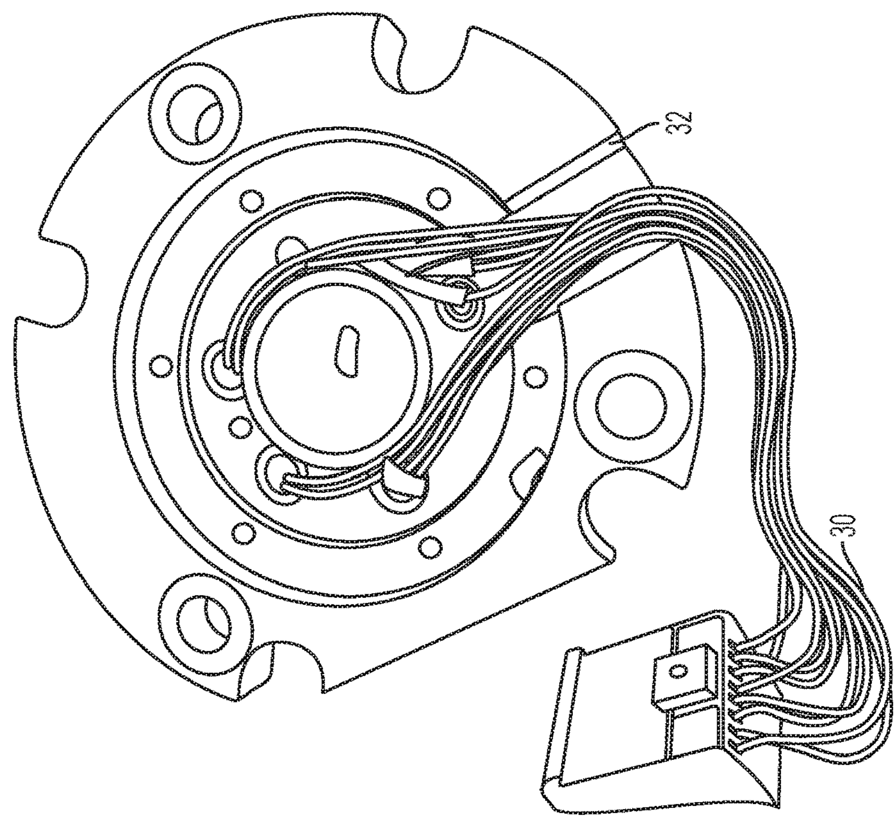
FIG. 11 is a bottom view of the base showing the heater conductors positioned in a channel in the base.
Figure 13:
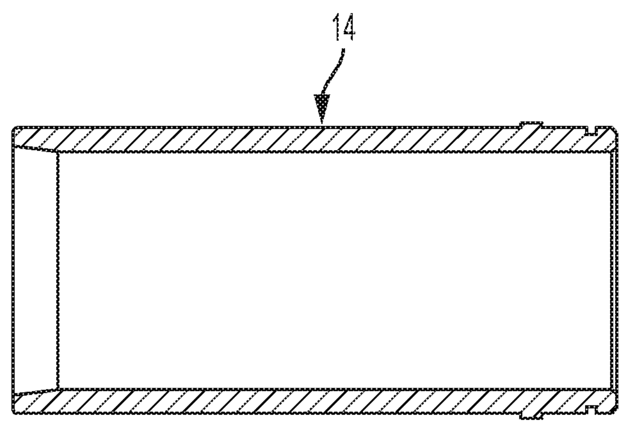
FIG. 13 is a sectional view of the chamber.
Figure 14A:
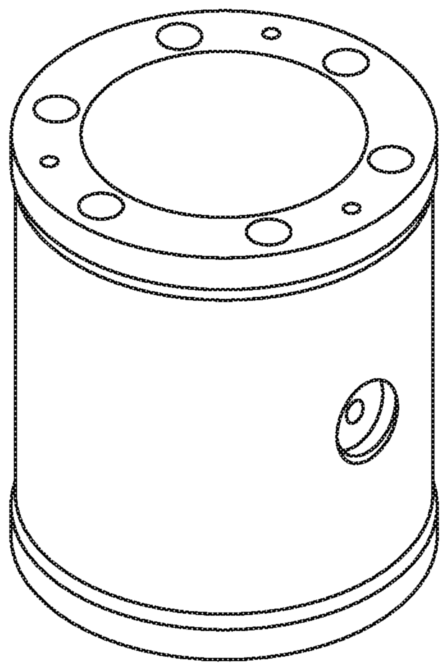
FIGS. 14A-14D are perspective (FIG. 14A), sectional (FIGS. 14B and C) and top (FIG. 14D) views of the outer housing.
Figure 14B:
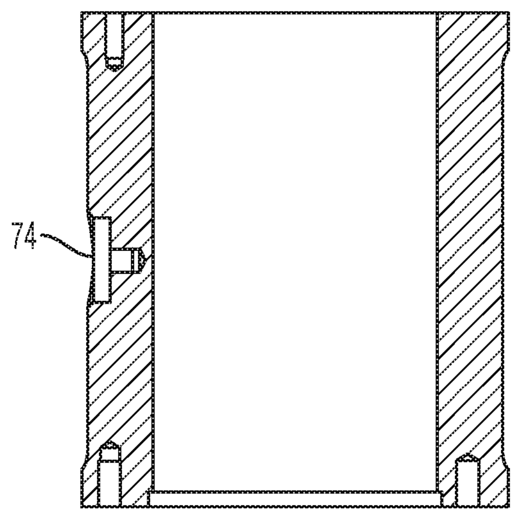
Figure 14C:
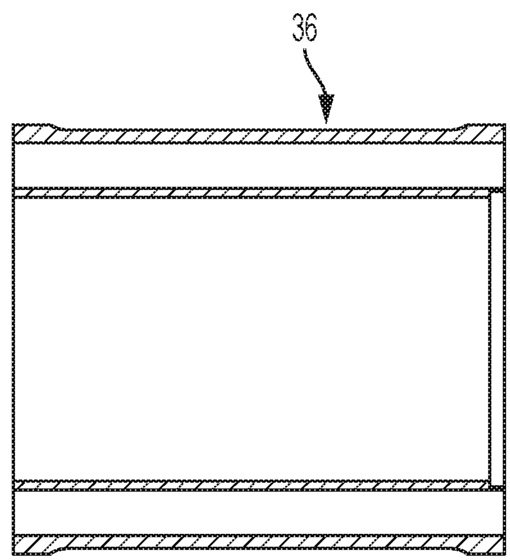
Figure 14D:
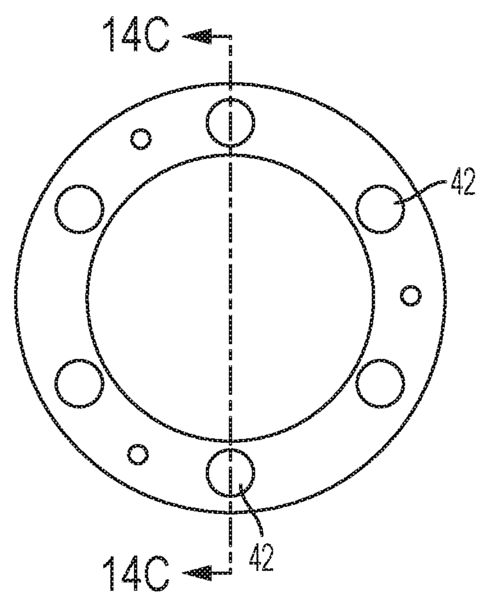
Figure 15A:
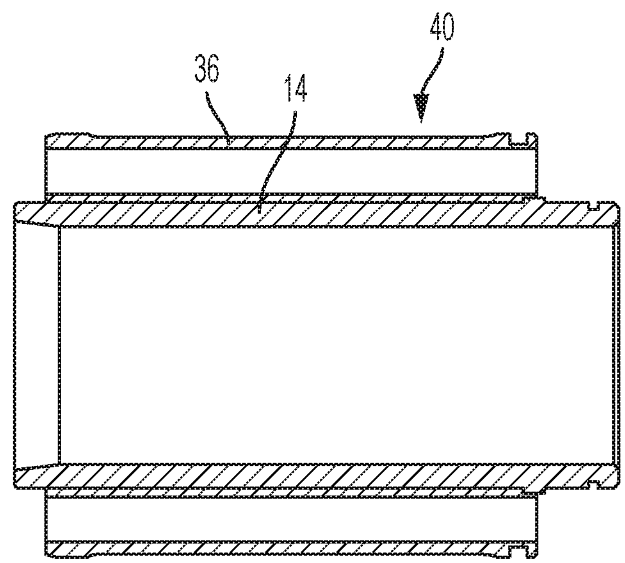
FIGS. 15A and B are sectional (FIG. 15A) and top (FIG. 15B) views of the core assembly as mounted to one another.
Figure 15B:
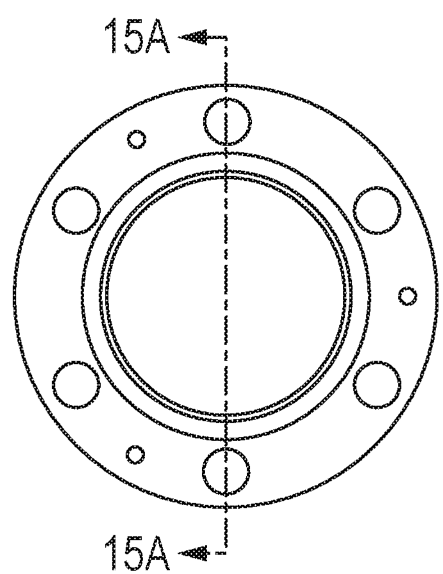
Figure 16A:
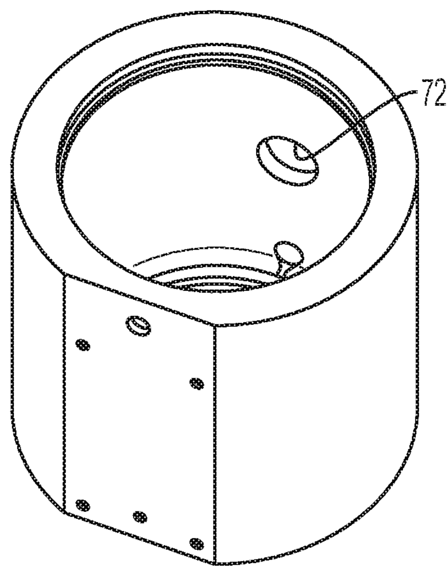
FIGS. 16A and 16B are perspective (FIG. 16A) and plan (FIG. 16B) views of the outer housing.
Figure 16B:
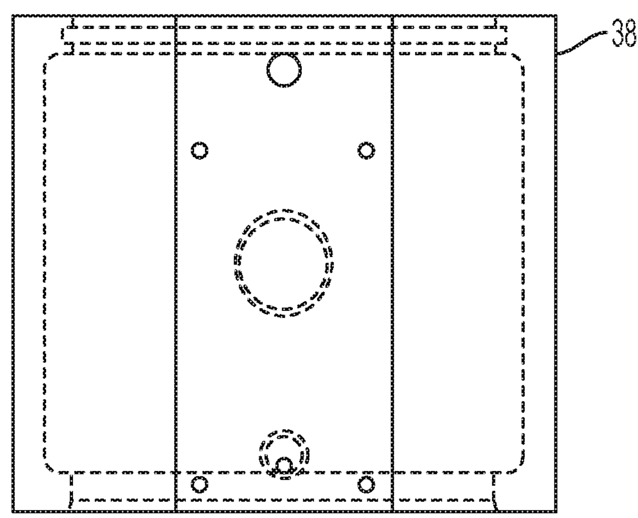
Figure 17A:
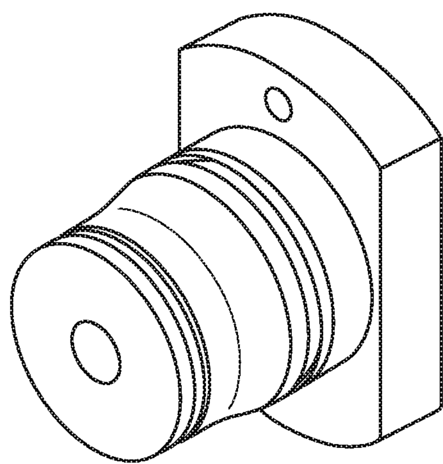
FIGS. 17A-17C are perspective (FIG. 17A), sectional (FIG. 17B) and front (FIG. 17C) views of the thermostat mount.
Figure 17B:
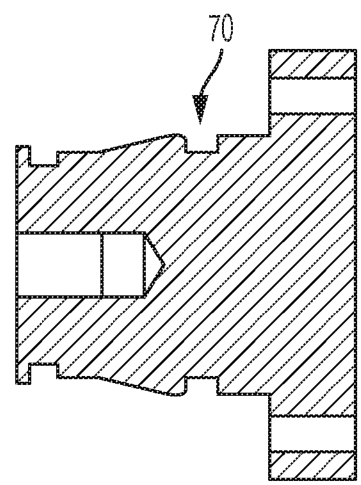
Figure 17C:
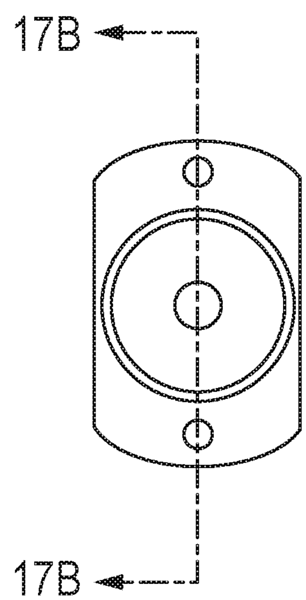

A control panel (not shown) is provided for the system 10. Fluid 28 and electrical 30 connectors extend to and into the housing 16 and base 12, respectively, and connect to various components. Referring briefly to FIG. 11, the electrical connections 30 extend through a channel 32 in the base 12 to provide power and control to heaters 34 as will be describe in more detail below.

The chamber 14 is fixedly mounted within the chamber housing 16. In an embodiment, the housing 16 includes an inner housing 36 and an outer housing 38. The chamber 14 and inner housing 36 can be machined components that are fitted to one another. In a present embodiment, the chamber 14 is a machined steel component and the inner housing 36 is a machined aluminum component. The chamber 14 is fitted into the inner housing 36 taking advantage of the differences in thermal expansion of the materials. For example, the chamber 14 can be cooled (to shrink or contract), or the inner housing 36 can be heated (to expand), or both, and the chamber 14 inserted and positioned within the inner housing 36. The parts are then allowed to return to ambient temperature, so that a tight fit is achieved between the chamber 14 and the inner housing 36. The chamber/inner housing assembly is referred to as a core or core assembly 40.

Figure 9:
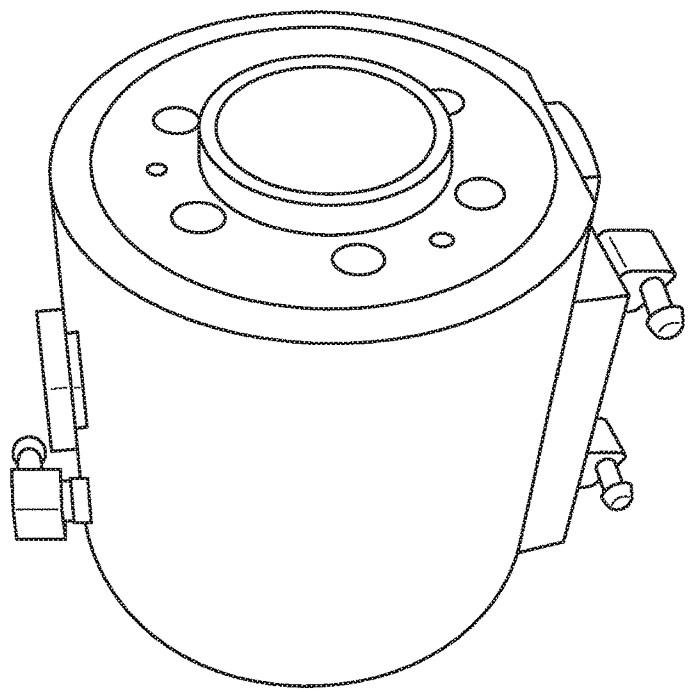
FIG. 9 is a perspective view of the outer housing assembled with the cooling fluid inlet and outlet conduits.
Figure 10:
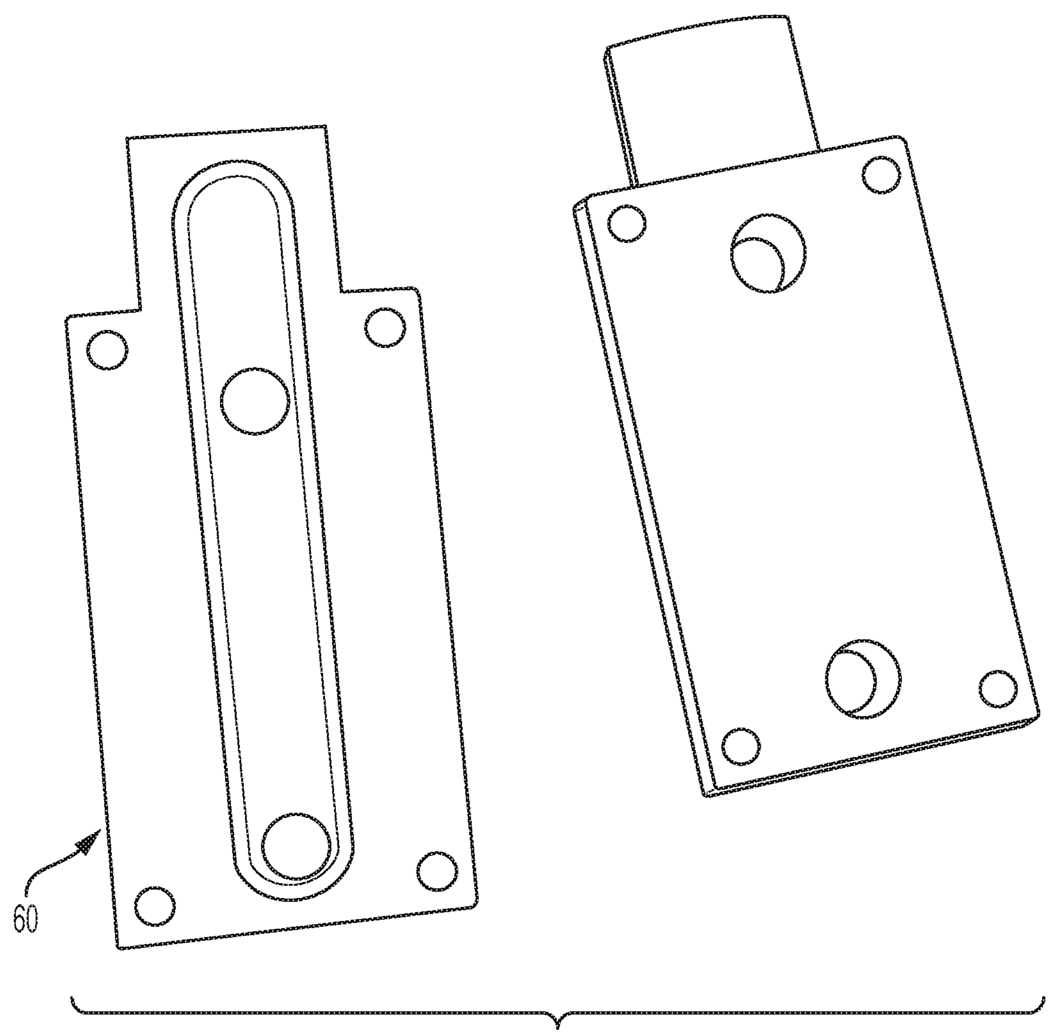
FIG. 10 are views of the cooling fluid manifold.
Figure 12:
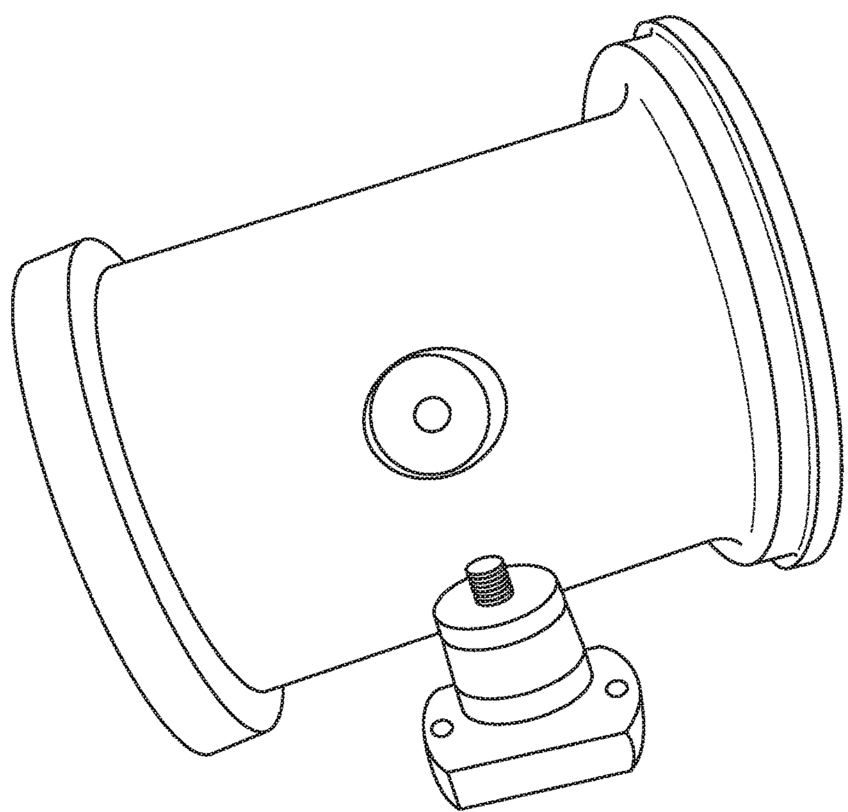
FIG. 12 is a view of the inner housing showing the bore in which the thermostat is positioned.

The inner housing 36 includes a plurality of bores 42 extending longitudinally therethrough. In a current embodiment, the inner housing 36 includes six equally circumferentially spaced through-bores 42. The through-bores 42 are configured to accommodate the heaters 34, such as electric heaters, positioned therein (see, for example, FIGS. 9 and 11) for heating the system 10 during the encapsulation cycle. The inner housing 36 has upper and lower integral, outwardly extending flanges 44, 46 that define a central cut-out region 48.

The outer housing 38 is fitted over the inner housing 36 and mounts to the inner housing 36 at the inner housing upper and lower flanges 44, 46. A space 50 is defined between the inner 36 and outer 38 housings (as formed by the inner housing flanges 44, 46 extending outwardly from the wall of the inner housing 36). The space 50 forms a cooling jacket that is adapted for coolant flow at the end of the encapsulation cycle as will be described in more detail below.

The housing 16 and base 12 are fixedly mounted to each other and are mounted to the cylinder housing 20 by fasteners such as shoulder bolts 52. The housing 16 and base 12 are moveable along the bolts 52 toward and away from the cylinder housing 20. As such, as the housing 16 moves toward and away from the cylinder housing 20, the chamber 14 likewise moves toward and away from the cylinder housing 20. The biasing elements 26, e.g., the illustrated wave springs Belleville washers) bias the base 12, chamber 14 and housing 16 away from the cylinder housing 20. A stop 54, such as the illustrated shoulder screw, permits setting the distance from which the housing 16 can move away from the cylinder housing 20.

As noted above, the housing 16 includes both a cooling system and a heating system. The heating system includes the plurality of electric heating coils 34 within the throughbores 42 in the inner housing 36, surrounding the chamber 14. The cooling system includes the jacket 50 as noted above, a cooling fluid inlet 56 and cooling fluid outlet 58, a manifold 60 and a vacuum relief assembly 62 that include a passive (non-powered) air check valve 64. The manifold 60 is in fluid communication with the outlet 58 and with an opening 66 at about the top of the cooling jacket 50.

The system 10 includes a thermostat 68, and a keyed fitting 70 for the thermostat 68 that, in an embodiment, is inserted through an opening 72 in the outer housing 38 and is threaded into a bore 74 in the inner housing 36, between adjacent heater bores 42. The bore 74 in the inner housing 36 is in to, but not through the wall of the inner housing 36. The thermostat keyed fitting 70 is about 180 degrees from the cooling system manifold 60. The system 10 can include one or more temperature sensors (not shown).

The cap assembly 18 includes a cap mounting plate 76 disposed at an end of the chamber 14 opposite the base 12. The mounting plate 76 can be mounted to, for example, posts or spacers (not shown) and is fixed relative to the cylinder housing 20. In this configuration, the base 12, chamber housing 16 and chamber 14 move toward and away from the mounting plate 76 or move between the mounting plate 76 and the cylinder housing 20.

The cap assembly 18 includes a cap 78, and the cap 78 and mounting plate 76 include a cooperating securing assembly, such as a bayonet mount, to secure the cap 78 to the mounting plate 76. It will be understood that in this configuration, the cap 78 is mounted to the mounting plate 76 which is stationary relative to the moving chamber housing 16 and chamber 14. It will also be understood that any type of mount can be used to secure the cap 78 to the mounting plate 76 and that the bayonet mount is illustrative of one type of mount that can be used.

The cap 78 includes a first or upper ram 80 mounted thereto. The upper ram 80 is configured for insertion into the chamber 14 at the inlet to establish a pressure boundary and forms one side or end of the mold cavity. The upper ram 80 can be mounted to the cap 78 by an adjustable element 82 to allow for properly adjusting the seating of the upper ram 80 in the chamber 14. The upper ram 80 has a tapered wall that mates with the chamber 14 tapered wall.

The cap 78 is mounted to system by a post 84 that rides in a linear bearing 86 that allows the cap 78 to be lowered and raised toward and away from the mounting plate 76. A constant force spring 88, such as the illustrated wound steel spring, facilitates raising and lowering the cap 78 with minimal force. The spring 88 can have a force about equal to the weight of the cap 78.

The system 10 includes the lower ram 24 that is disposed in the chamber 14, opposite the upper ram 80. In a present embodiment, the lower ram 24 is a hydraulic ram that is driven by a reciprocating piston mounted within the cylinder housing 20. The ram 24 moves upward toward the upper ram 80 when in the molding or encapsulation cycle, and downward, away from the upper ram 80 for loading the chamber 14 and when releasing an encapsulated sample.

In use, at the beginning of the cycle, the cap 78 is opened and fully retracted and rotated away from the chamber 14 and housing 16. The lower ram 24 is in a withdrawn position.

A sample and encapsulating material are introduced into the chamber 14. The cap 78 is positioned over the chamber 14 and housing 16 and is lowered onto the mounting plate 76. The cap 78 is then locked to the mounting plate 76. The upper ram 80 is positioned in, but not fully engaged with the chamber 14 inlet end.

The encapsulation cycle commences with the cylinder 22 actuating and the lower ram 24 moving up. As the lower ram 24 moves up, the springs 26 that engage the chamber 14 and housing 16 urge the chamber 14 and housing 16 upward, and move the chamber 14 inlet fully into engagement with the upper ram 80. The upper ram 80 taper and the chamber 14 tapered wall seal the ram 80 in the chamber 14. Force up to about 15,000 pounds is exerted by the lower ram 24 moving into the chamber 14, toward the upper ram 80.

Heat is then applied to the chamber 14 by the heaters 34, and the heat and pressure exerted by the lower ram 24 against the sample and encapsulation material, over a predetermined period of time, fuses the encapsulation material and the sample to form the encapsulated sample.

Following heating and compression the encapsulation cycle—the heating system 34 isolates and the cooling system commences cooling of the sample. In the cooling cycle, a cooling fluid, such as water, is inlet into the cooling jacket 50 through the fluid inlet 56. The coolant flows through the jacket 50 and out through the outlet 58.

The opening 66 at the top of the jacket 50 is in fluid communication with the manifold 60. As such, coolant flows out of the jacket opening 66 down through the manifold 60 and out of the outlet 58 at the same time that fluid drains from the jacket 50 out through the outlet 58.

Once a desired handling temperature is reached, the cooling system isolates—that is, the flow of cooling fluid is stopped. The system 10 begins to drain by fluid exiting through the outlet 58. To facilitate drainage and to overcome any vacuum that is created in the jacket 50, the manifold 60 includes the vacuum relief assembly 62. In a present embodiment, the vacuum relief assembly 62 includes the vacuum relief or vacuum breaker valve 64 mounted to, and in fluid communication with, the manifold 60. As fluid drains from the jacket 50, a low pressure region will develop in the jacket 50, reducing the out flow of fluid. The vacuum relief valve 64, which is, for example, an air check valve, will allow air to enter the cooling system (enter the jacket 50) thereby reducing or eliminating any low pressure regions (e.g., eliminating any vacuum that may develop) within the cooling system and allowing the cooling to freely flow from the system. Draining the cooling system in this manner has a number of advantages, but primarily, it readies the encapsulation system 10 for a subsequent encapsulation cycle in that the cooling fluid quickly and thoroughly drains from the system. In this manner, the heaters 34 do not have to heat any cooling fluid that may remain in the cooling system when heating the housing 16/chamber 14/sample. Thus, less time and energy are required to carry out a subsequent encapsulation cycle. It will be appreciated that this non-powered or passive arrangement will permit air to enter the system to facilitate draining and will close or isolate as the system is filled with cooling fluid.

At a desired time during or following the cooling cycle, the lower ram 24 withdraws or retracts. As the ram 24 retracts, it pulls or urges the chamber 14 and housing 16 downward (against the spring 26 force), toward the cylinder housing 20 and away from the upper ram 80. This facilitates more easily loosening the cap 78 from the mounting plate 76 so that the cap 78 is readily removed from the chamber 14 and the cap 78 can be opened and the encapsulated sample removed.

With reference to the aforementioned application to Freson et al., those skilled in the art will recognize the programming necessary to effectuate operation of the control system, and will appreciate the numerous other ways in which the system controls can operate.

All patents and patent applications referred to herein, are incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

It will be appreciated by those skilled in the art that the relative directional terms such as upper, lower, rearward, forward, top, bottom and the like are for explanatory purposes only and are not intended to limit the scope of the disclosure.

From the foregoing it will be observed that numerous modifications and variations can be effectuated without departing from the true spirit and scope of the novel concepts of the present disclosure. It is to be understood that no limitation with respect to the specific embodiments illustrated is intended or should be inferred. The disclosure is intended to cover all such modifications as fall within its scope.

What is claimed is:

1. A sample encapsulation system comprising:
a base;
a chamber, the chamber having an inlet;
a chamber housing, the chamber housing having an inner housing and an outer housing, the chamber being fixedly mounted at least in part within the inner housing, wherein the chamber housing is movably mounted to the fixture and the base, and wherein the chamber and housing are affixed relative to one another;
a cap;
a first ram operably mounted to the cap for engaging the chamber inlet;
a second ram positioned in the chamber opposite the inlet, the second ram movable toward and away from the first ram;
a heating assembly positioned at least in part in the inner housing; and
a cooling assembly, the cooling assembly including a cooling jacket defined in part by the inner housing and the outer housing, the cooling assembly including a manifold,
wherein the chamber, chamber housing and base are movable toward the cap for engaging the first ram with the chamber inlet during an encapsulation cycle and away from the cap, disengaging the first ram from the chamber inlet following an encapsulation cycle,
wherein the manifold is mounted to the outer housing and wherein the manifold includes two openings in fluid communication with the cooling jacket, one of the openings being a coolant drainage opening, the other opening being a vacuum relief opening.

2. The sample encapsulation system of claim 1 including a vacuum relief check valve mounted to the vacuum relief opening.

3. The sample encapsulation system of claim 1 including a thermostat in communication with the inner housing.

4. The sample encapsulation system of claim 1 wherein the second ram is driven by a cylinder mounted within a cylinder housing and wherein the base, the chamber and chamber housing are biasedly mounted to the cylinder housing.

5. The sample encapsulation system of claim 4 including a cap mount for securing the cap, and wherein the cap mount is fixedly mounted to the cylinder housing.

6. A sample encapsulation, comprising:
a base;
a chamber, the chamber having an inlet;
a chamber housing, the chamber housing having an inner housing and an outer housing, the chamber being fixedly mounted at least in part within the inner housing, wherein the chamber housing is movably mounted to the fixture and the base, and wherein the chamber and housing are affixed relative to one another;
a cap;
a first ram operably mounted to the cap for engaging the chamber inlet;
a second ram positioned in the chamber opposite the inlet, the second rani movable toward and away from the first ram;
a heating assembly positioned at least in part in the inner housing; and
a cooling assembly, the cooling assembly including a cooling jacket defined in part by the inner housing and the outer housing, the cooling assembly including a manifold,
wherein the chamber, chamber housing and base are movable toward the cap for engaging the first ram with the chamber inlet during an encapsulation cycle and away from the cap, disengaging the first ram from the chamber inlet following an encapsulation cycle,
further including a plurality of through-bores in the inner housing.

7. The sample encapsulation system of claim 6 wherein heaters are positioned in the through-bores.

8. The sample encapsulation system of claim 7 wherein the heaters are electrically powered heaters and wherein the base includes a channel formed to accommodate conductors extending to the heaters.

9. A sample encapsulation, comprising:
a base;
a chamber, the chamber having an inlet;
a chamber housing, the chamber housing having an inner housing and an outer housing,
the chamber being fixedly mounted at least in part within the inner housing, wherein the chamber housing is movably mounted to the fixture and the base, and wherein the chamber and housing are affixed relative to one another;
a cap;
a first ram operably mounted to the cap for engaging the chamber inlet;
a second ram positioned in the chamber opposite the inlet, the second ram movable toward and away from the first ram;
a heating assembly positioned at least in part in the inner housing; and
a cooling assembly, the cooling assembly including a cooling jacket defined in part by the inner housing and the outer housing, the cooling assembly including a manifold,
wherein the chamber, chamber housing and base are movable toward the cap for engaging the first ram with the chamber inlet during an encapsulation cycle and away from the cap, disengaging the first ram from the chamber inlet following an encapsulation cycle,
including an opening in the outer housing and bore into a portion of the inner housing, the outer housing opening and the inner housing bore aligned with one another and configured to accommodate a thermostat mount, and further including a thermostat in communication with the inner housing.

10. A sample encapsulation, comprising:

a base;

a chamber, the chamber having an inlet;

a chamber housing, the chamber housing having an inner housing and an outer housing, the chamber being fixedly mounted at least in part within the inner housing, wherein the chamber housing is movably mounted to the fixture and the base, and wherein the chamber and housing are affixed relative to one another;

a cap;

a first ram operably mounted to the cap for engaging the chamber inlet;

a second ram positioned in the chamber opposite the inlet, the second ram movable toward and away from the first ram;

a heating assembly positioned at least in part in the inner housing; and a cooling assembly, the cooling assembly including a cooling jacket defined in part by the inner housing and the outer housing, the cooling assembly including a manifold, wherein the chamber, chamber housing and base are movable toward the cap for engaging the first ram with the chamber inlet during an encapsulation cycle and away from the cap, disengaging the first ram from the chamber inlet following an encapsulation cycle; and wherein the chamber and the inner housing are formed from dissimilar metals having different rates of thermal expansion.

11. The sample encapsulation system of claim 10 wherein the chamber is fitted into the inner housing by one or both of heating the inner housing and cooling the chamber.

12. The sample encapsulation system of claim 10 wherein the chamber is formed from steel and the inner housing is formed from aluminum.

13. The sample encapsulation system of claim 10 wherein one or both of chamber and the inner housing are formed by machining.

* * * * *